United States Patent
Kimura-Suda et al.

(10) Patent No.: US 6,414,089 B1
(45) Date of Patent: Jul. 2, 2002

(54) METHOD OF MANUFACTURING POLYMER FILMS HAVING SECOND ORDER NON-LINEAR OPTICAL PROPERTIES, POLYMER FILMS, AND NON-LINEAR OPTICAL ELEMENT

(75) Inventors: Hiromi Kimura-Suda; Hiroyuki Sasabe, both of Tokyo; Tatsuo Wada, Saitama-ken, all of (JP)

(73) Assignees: Riken; Japan Science and Technology Corporation, both of Saitama-ken (JP)

(*) Notice: Subject to any disclaimer, the term of this patent is extended or adjusted under 35 U.S.C. 154(b) by 0 days.

(21) Appl. No.: 09/650,296

(22) Filed: Aug. 29, 2000

(30) Foreign Application Priority Data

Feb. 29, 2000 (JP) ......................................... 2000-054949

(51) Int. Cl.$^7$ ......................... C08L 25/00; C09K 19/02; B32B 9/00; H05B 6/00; G02F 1/00
(52) U.S. Cl. ..................... 525/242; 525/243; 525/244; 525/256; 525/260; 525/276; 525/277; 525/279; 525/282; 525/295; 526/201; 526/204; 526/218.1; 526/262; 526/265; 526/269; 526/287; 526/288; 428/1.1; 428/411.1; 428/412; 428/422; 428/430; 428/473.5; 428/475.8; 428/480; 428/483; 428/500; 427/457; 427/458; 359/257; 359/328; 359/332; 385/122; 385/141; 264/405; 264/435; 264/436; 264/440; 264/444
(58) Field of Search ................................. 264/405, 435, 264/436, 440, 444; 385/122, 141; 359/257, 328, 332; 427/457, 458; 428/1.1, 411.1, 412, 422, 430, 473.5, 475.8, 480, 483, 500; 526/201, 204, 218.1, 262, 265, 269, 287, 288; 525/242, 243, 244, 256, 260, 276, 277, 279, 282, 295

(56) References Cited

U.S. PATENT DOCUMENTS

| | | | |
|---|---|---|---|
| 4,810,433 A | * | 3/1989 | Takayanagi et al. .......... 264/22 |
| 4,983,318 A | * | 1/1991 | Matsumoto et al. ... 252/299.01 |
| 4,999,139 A | | 3/1991 | Kurihara et al. ............. 252/587 |
| 5,112,934 A | * | 5/1992 | Kester et al. .................. 528/99 |
| 5,131,068 A | * | 7/1992 | Kanarian et al. ............ 385/141 |
| 5,175,784 A | | 12/1992 | Enomoto et al. ............ 385/112 |
| 5,224,196 A | * | 6/1993 | Khanarian et al. .......... 385/122 |
| 5,290,630 A | | 3/1994 | Devonald et al. ............ 428/333 |
| 5,448,665 A | | 9/1995 | Kershaw et al. ............... 385/30 |
| 5,512,218 A | * | 4/1996 | Gresser et al. ............. 264/1.34 |
| 5,648,453 A | * | 7/1997 | Saida et al. .................. 528/380 |
| 5,676,883 A | | 10/1997 | Jeng et al. .................... 252/582 |
| 5,688,873 A | * | 11/1997 | Saida et al. .................. 525/410 |
| 5,882,785 A | * | 3/1999 | Hollins et al. ............... 428/333 |
| 6,090,332 A | * | 7/2000 | Marder et al. ............... 264/435 |
| 6,277,441 B1 | * | 8/2001 | Endo et al. .................. 427/240 |

* cited by examiner

Primary Examiner—P. Hampton-Hightower
(74) Attorney, Agent, or Firm—Fulbright & Jaworski L.L.P.

(57) ABSTRACT

A method of manufacturing a polymer film having second order non-linear optical properties which has excellent stability of orientated molecules and does not become disorientated, and a polymer film and a non-linear optical element are provided. A polymer solution is placed between two substrates, which are disposed substantially perpendicular with respect to a rotating stand and substantially symmetrical with respect to a rotation axis of the rotating stand, and the rotating stand is rotated. A polymer film having second order non-linear optical properties is formed by the centrifugal force generated at the polymer solution. The polymer solution is a solution formed by dissolving, in an organic solvent, at least one of (1) a host-guest polymer in which low molecular weight compounds are dispersed in polymers, (2) a modified polymer in which regions which exhibit a function of second order non-linear optical properties are chemically modified in polymer side chains and/or a polymer main chain, and (3) a crosslinked polymer. Among these, modified polymers are particularly preferable.

19 Claims, 4 Drawing Sheets

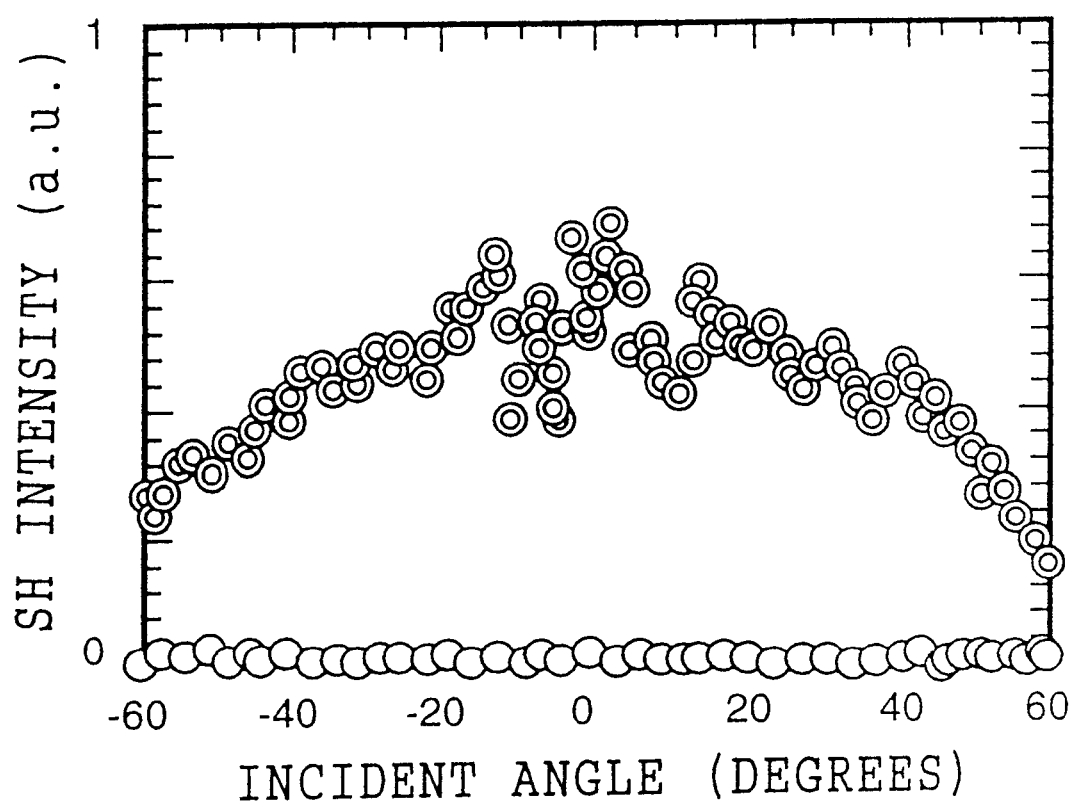
F I G. 3

METHOD OF MANUFACTURING POLYMER FILMS HAVING SECOND ORDER NON-LINEAR OPTICAL PROPERTIES, POLYMER FILMS, AND NON-LINEAR OPTICAL ELEMENT

BACKGROUND OF THE INVENTION

1. Field of the Invention

The present invention relates to a method of manufacturing polymer films having second order non-linear optical properties such as second harmonic generating (SHG), the Pockels effect, or the like, and to polymer films and a non-linear optical element.

2. Description of the Related Art

In recent years, non-linear optical materials have been applied to optical devices such as ultra fast optical switches, phase compensator, wavelength converter, and the like. Spin coating has conventionally been used as a method for manufacturing a polymer film used as a non-linear optical material.

In a conventional spin coating method, a polymer solution is applied dropwise onto a rotating substrate, which is thereafter rotated at high speed. Thus, centrifugal force works uniformly on the polymer solution such that regions exhibiting the function of second order non-linear optical properties (hereinafter, such regions are referred to as "chromophores") cannot be orientated. As a result, in order to express second order non-linear optical properties in a polymer material, a process (poling) is required in which an external electric field is applied at a temperature higher than or equal to the glass transition temperature (Tg) so as to orientate the dipoles.

However, the conditions of the poling may lead to an alteration of the polymer substance. Further, even at temperatures less than or equal to Tg, it is easy for the dipoles which have been orientated by the poling to become disorientated Thus, the phenomenon of orientational decay is unavoidable after electric field poling.

SUMMARY OF THE INVENTION

An object of the present invention is to provide a method of manufacturing a polymer film having second order non-linear optical properties, such as second harmonic generating (SHG) or the Pockels effect or the like, which polymer film has excellent stability of the orientated molecules and whose orientated molecules do not become disorientated, and to polymer films, and a non-linear optical element.

The above-described objects are achieved by the following means.

The first aspect of the present invention is a method of manufacturing a polymer film having second order non-linear optical properties, the method comprising the steps of: placing a polymer solution between two substrates which are disposed substantially perpendicular with respect to a rotating stand and substantially symmetrical with respect to a rotation axis of the rotating stand; and rotating the rotating stand to form a polymer film having second order non-linear optical properties due to centrifugal force arising at the polymer solution.

In the second aspect of the present invention, in the method of the first aspect, the polymer solution is a solution in which at least one of the following types of polymers is dissolved in an organic solvent: (1) a host-guest polymer in which low molecular weight compounds are dispersed in polymers; (2) a modified polymer in which regions which express a function of second order non-linear optical properties are chemically modified in polymer side chains and/or a polymer main-chain; and (3) a crosslinked polymer.

In the third aspect of the present invention, in the method of the first aspect, the polymer solution is a solution in which a modified polymer, in which regions which express a function of second order non-linear optical properties are chemically modified in polymer side chains and/or a polymer main chain, is dissolved in an organic solvent.

In the fourth aspect of the present invention, in the method of the first aspect, the step of placing the polymer solution between the two substrates includes injecting the solution.

In the fifth aspect of the present invention, in the method of the first aspect, the step of rotating the rotating stand includes rotating the stand at a rotational speed of 1000 to 5000 rpm.

In the sixth aspect of the present invention, in the method of the fifth aspect, the rotating stand is rotated at a rotational speed of 2000 to 3000 rpm.

In the seventh aspect of the present invention, in the method of the first aspect, the two substrates are separated by a gap of 0.3 to 2 mm from one another.

In the eighth aspect of the present invention, in the method of the seventh aspect, the gap is from 0.5 to 1.5 mm.

In the ninth aspect of the present invention, in the method of the third aspect, the step of placing the polymer solution between the two substrates includes injecting the solution.

In the tenth aspect of the present invention, in the method of the third aspect, the step of rotating the rotating stand includes rotating the stand at a rotational speed of 1000 to 5000 rpm.

In the eleventh aspect of the present invention, in the method of the third aspect, the two substrates are separated by a gap of 0.3 to 2 mm from one another.

In the twelfth aspect of the present invention, in the method of the ninth aspect, the two substrates are separated from one another by a gap of 0.3 to 2 mm, and the step of rotating the rotating stand includes rotating the stand at a rotational speed of 1000 to 5000 rpm.

In the thirteenth aspect of the present invention, in the method of the twelfth aspect, the rotating stand is rotated at a rotational speed of 2000 to 3000 rpm, and the gap is from 0.5 to 1.5 mm.

The fourteenth aspect of the present invention is a polymer film having second order non-linear optical properties, the polymer film being manufactured by a method including the steps of: placing a polymer solution between two substrates which are disposed substantially perpendicular with respect to a rotating stand and substantially symmetrical with respect to a rotation axis of the rotating stand; and rotating the rotating stand to form a polymer film having second order non-linear optical properties due to centrifugal force arising at the polymer solution.

In the fifteenth aspect of the present invention, in the polymer film of the fourteenth aspect, the polymer solution is a solution in which at least one of the following types of polymers is dissolved in an organic solvent: (1) a host-guest polymer in which low molecular weight compound are dispersed in polymers; (2) a modified polymer in which regions which express a function of second order non-linear optical properties are chemically modified in polymer side chains and/or a polymer main chain; and (3) a crosslinked polymer.

In the sixteenth aspect of the present invention, in the polymer film of the fourteenth aspect, the polymer solution is a solution in which a modified polymer, in which regions which express a function of second order non-linear optical properties are chemically modified in polymer side chains and/or a polymer main chain, is dissolved in an organic solvent.

The seventeenth aspect of the present invention is a non-linear optical element comprising a polymer film having second order non-linear optical properties, the polymer film being manufactured by a method including the steps of: placing a polymer solution between two substrates which are disposed substantially perpendicular with respect to a rotating stand and substantially symmetrical with respect to a rotation axis of the rotating stand; and rotating the rotating stand to form a polymer film having second order non-linear optical properties due to centrifugal force arising at the polymer solution.

In the eighteenth aspect of the present invention, in the non-linear optical element of the seventeenth aspect, the polymer solution is a solution in which at least one of the following types of polymers is dissolved in an organic solvent: (1) a host-guest polymer in which low molecular weight compounds are dispersed in polymers; (2) a modified polymer in which regions which express a function of second order non-linear optical properties are chemically modified in polymer side chains and/or a polymer main chain; and (3) a crosslinked polymer.

In the nineteenth aspect of the present invention, in the non-linear optical element of the seventeenth aspect, the polymer solution is a solution in which a modified polymer, in which regions which express a function of second order non-linear optical properties are chemically modified in polymer side chains and/or a polymer main chain, is dissolved in an organic solvent.

When a polymer solution is placed between two substrates, which are disposed perpendicularly with respect to a rotating stand and symmetrical with respect to the rotation axis of the rotating stand, and the rotating stand is rotated, the orientation of the molecules of the polymer film is in-plane orientated due to the centrifugal force arising at the polymer solution, and is parallel to the direction of flow, such that the orientations are opposite at both ends of the substrate. Accordingly, a polymer film exhibiting two polar orientations within the same plane is formed.

BRIEF DESCRIPTION OF THE DRAWINGS

FIG. 3 is a graph illustrating the results of SHG measurement of the polymer films of the Example and Comparative Example 1.

DESCRIPTION OF THE PREFERRED EMBODIMENT

Hereinafter, a preferable embodiment of the present invention will be described.

Figure 1A:
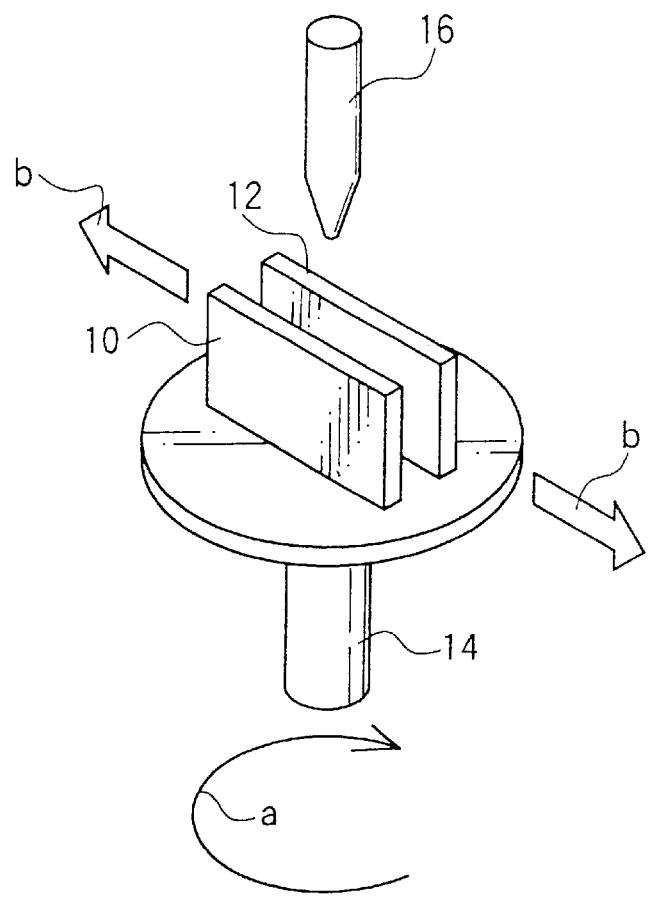
FIG. 1A is schematic perspective view showing a method of manufacturing a polymer film having second order non-linear optical properties of the present invention.
Figure 1B:
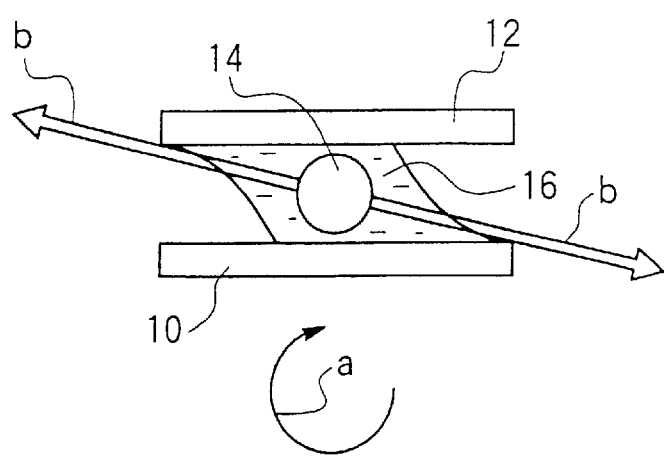
FIG. 1B is a schematic perspective view showing the method of manufacturing the polymer film shown in FIG. 1A.

FIG. 1A is schematic perspective view showing a method of manufacturing a polymer film having second order non-linear optical properties of the present invention. FIG. 1B is a schematic perspective view showing the method of manufacturing the polymer film shown in FIG. 1A. In FIGS. 1A and 1B, substrates 10, 12 are disposed perpendicularly to a rotating stand, and symmetrically with respect to the rotation axis of the rotating stand. A rotation axis 14 is positioned exactly between the substrates 10, 12. The rotation axis 14 can be rotating by a drive source (not shown), such that the substrates 10, 12 are rotated in a state in which a polymer solution 16 is disposed between the substrate 10, 12. When the substrates 10, 12 are rotated at high speed in the direction of arrow a in FIGS. 1A and 1B, centrifugal force in the directions of arrows b in FIGS. 1A and 1B acts on the polymer solution 16.

In the present invention, the rotating stand is not limited to a circular rotating stand to whose top portion the substrates 10, 12 are fixed as shown in the figure. A nipping member which nips the substrates 10, 12, and a member for supporting the nipping member may be provided rotatably. Further, the surface of the rotating stand is positioned in a direction perpendicular to the direction of gravity. Accordingly, it is preferable that the surfaces of the substrates 10, 12 fixed on the rotating stand be positioned in the direction of gravity.

It suffices for the surfaces of the substrates 10, 12 to be flat and smooth. Examples of the substrates 10, 12 are glass plates, electrically conductive glass plates, metal plates, silicon wafers, chemical-resistant plastic plates, and the like. In order to apply the polymer film manufactured by the method of the present invention and the substrates to devices and the like, it is preferable that the substrates be glass or plastic plates or the like which are insulative bodies. Moreover, if plastic plates are used, it is preferable that they are chemically-resistant to the solvent used in the polymer solution.

Examples of the polymer material forming the polymer solution are (1) host-guest polymers in which low molecular weight compounds are dispersed in polymers, (2) modified polymers in which regions which express the function of the second order non-linear optical properties are chemically modified in polymer side chains and/or a polymer main chain, or (3) crosslinked polymers. The polymer material must be able to be dissolved in an organic solvent.

In the present invention, among these polymer materials, the modified polymers (2) are particularly suitable. The modified polymers (2) include main-chain polymers, side-chain polymers, main-chain side-chain polymers, and hyper-branched polymers having a branched structure, in which the regions exhibiting the function of second order non-linear optical properties (i.e., the chromophores) are chemically modified. Among these modified polymers, side-chain polymers and main-chain side-chain polymers are well-suited as polymers exhibiting polar alignment in two opposite directions within the same plane in accordance with the method of the present invention. Side-chain polymers and main-chain side-chain polymers have many degrees of freedom in the side chains, and because they have asymmetrical chromophores in the molecular structure, it is easy to achieve polar alignment due to the flow generated by centrifugal force. An example of chromophores is π-conjugated chromophores having donors and acceptors. Representative examples of the modified polymers (2) are polymers in which a non-linear optical (NLO) dye such as DR1, DANS, PNA, DCM, DMA, MNA, MONS, carbazole or the like is covalently bonded to the side chain of the polymer.

Specific examples of the host-guest polymers (1) in which low molecular weight compounds are dispersed in polymers are polymers in which a non-linear optical (NLO) dye, such as DR1, DANS, PNA, DCM, DMA, MNA, MONS, carbazole or the like, is dispersed in transparent polymers such as polymethyl methacrylate (PMMA), polyimide (PI), polycarbonate (PC), liquid crystal polymers, polyvinylidene fluoride, polyoxyethylene (POE), poly-ε-caprolactone (PCL), polybutylene sebacate (PBSe), and the like.

Specific examples of the transparent polymers of the host-guest polymers (1) are the following.

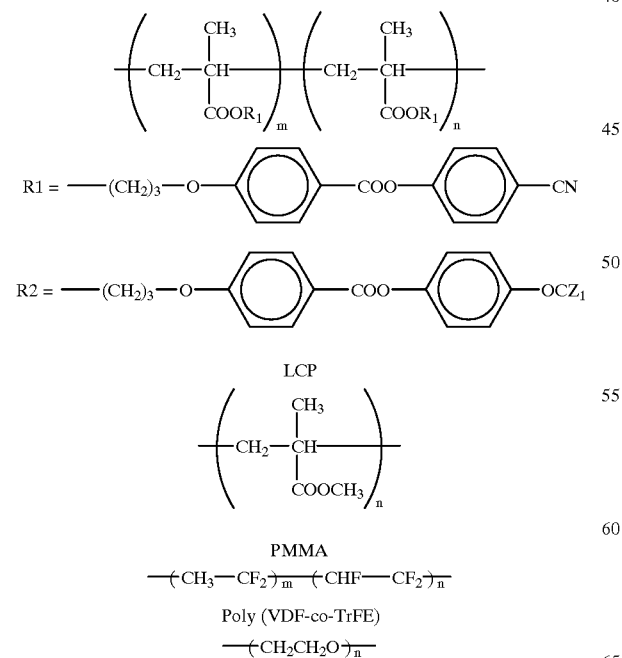

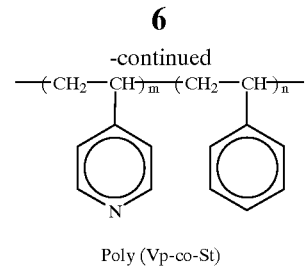

Poly (Vp-co-St)

Specific examples of the guest dye (non-linear optical dye) in the host-guest polymers (1) are the following.

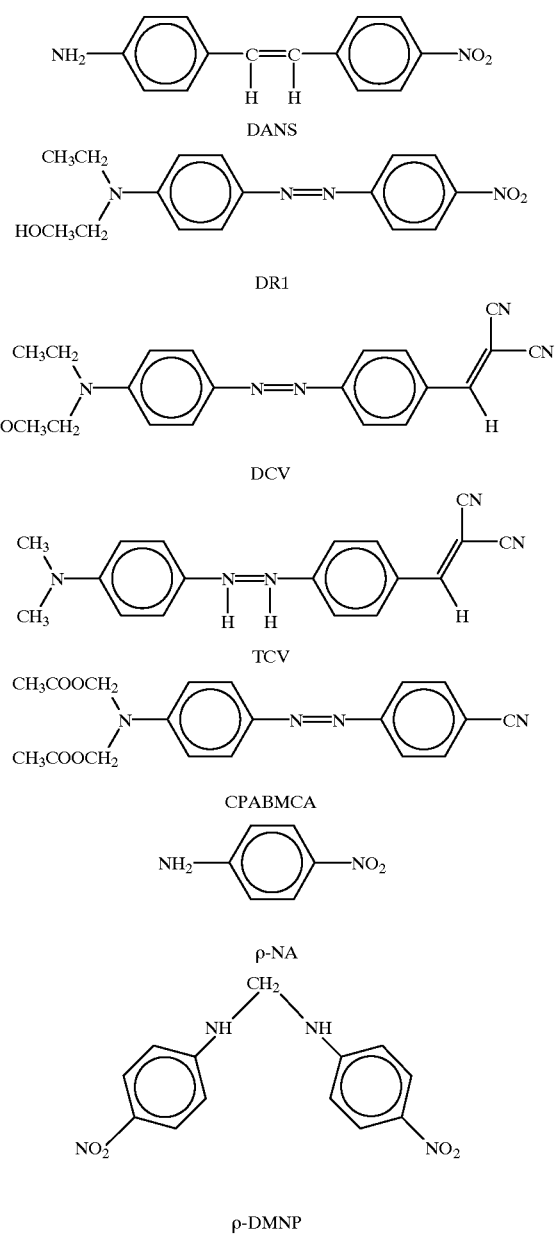

Specific examples, among the modified polymers (2), of main-chain polymers in which the chromophores are chemically modified are the following polymers.

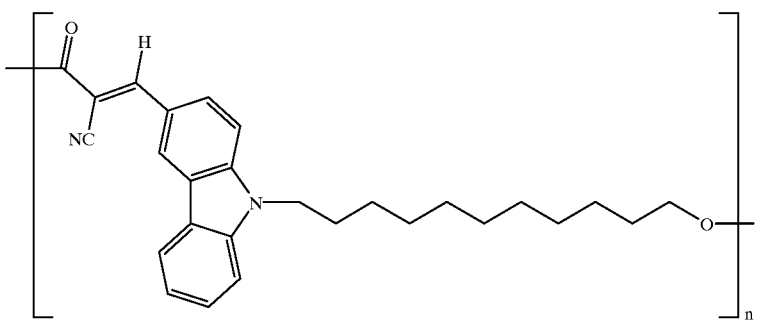
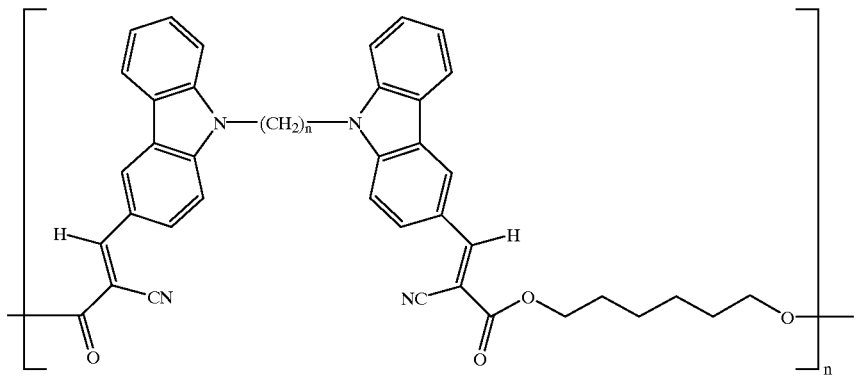
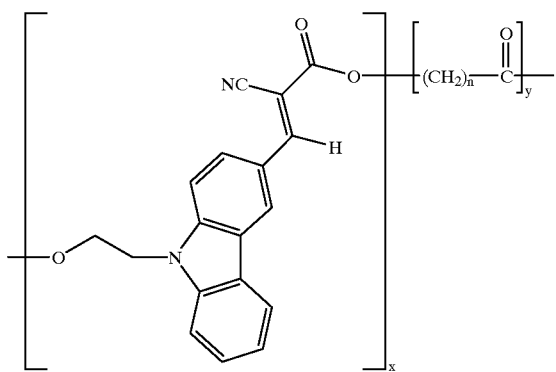
x = 0.7, y = 0.3
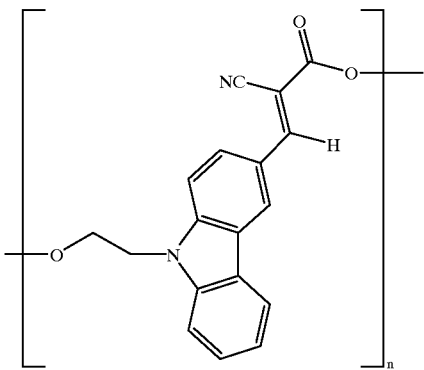

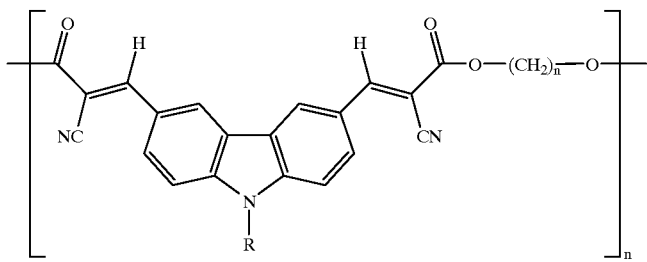
Specific examples, among the modified polymers (2), of side-chain polymers in which the chromophores are chemically modified are the following polymers.
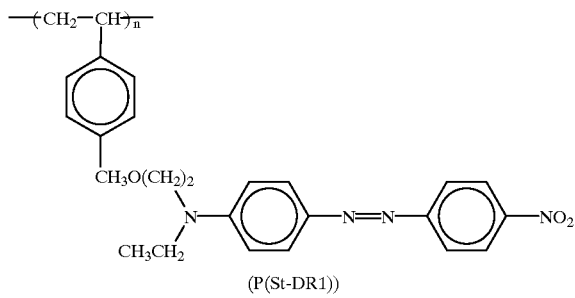
(P(St-DR1))
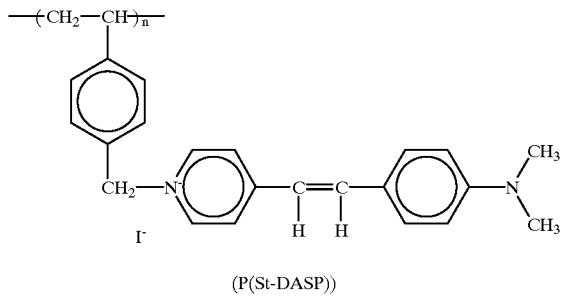
(P(St-DASP))
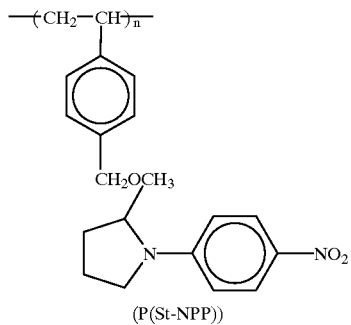
(P(St-NPP))
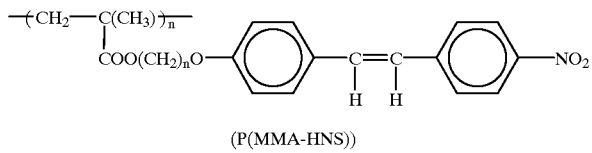
(P(MMA-HNS))
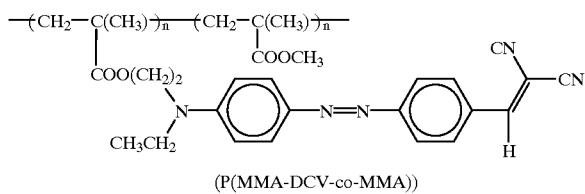
(P(MMA-DCV-co-MMA))
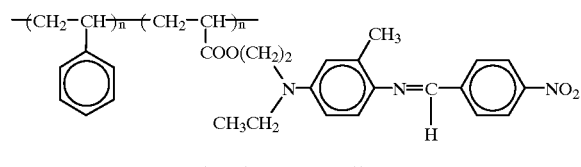
(Poly(St-co-MA-BA))
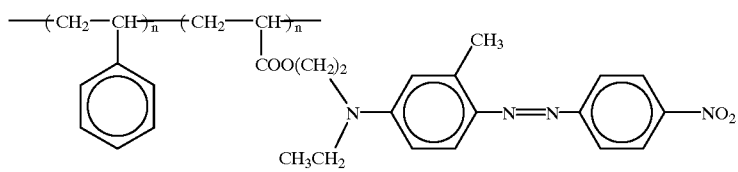
(Poly(St-co-MA-AB))
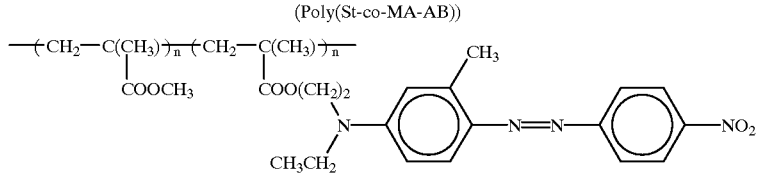
(Poly(MMA-co-MMA-AB))

-continued
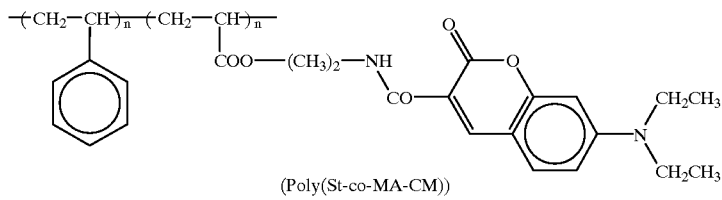
(Poly(St-co-MA-CM))
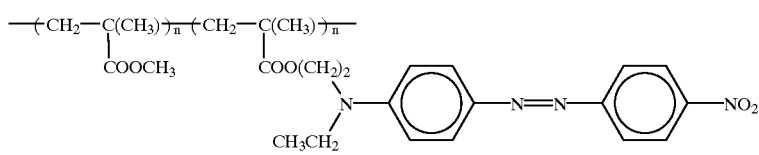
(Poly(MMA-co-MMA-DR1))
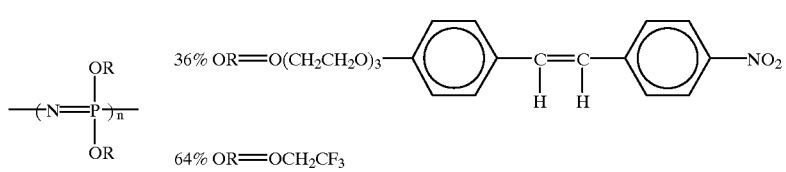
(Poly(organophosphazene-ANS))
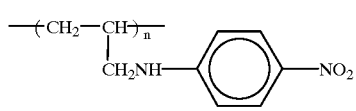
(PPNA)
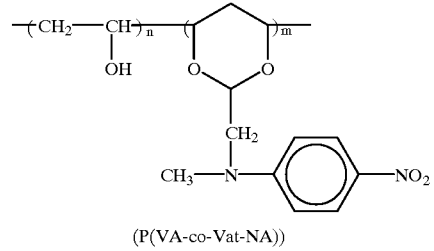
(P(VA-co-Vat-NA))
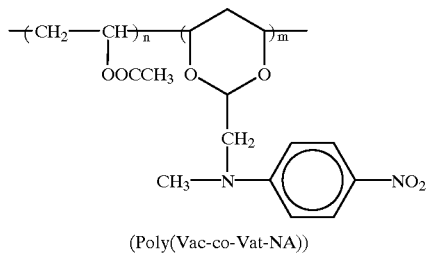
(Poly(Vac-co-Vat-NA))
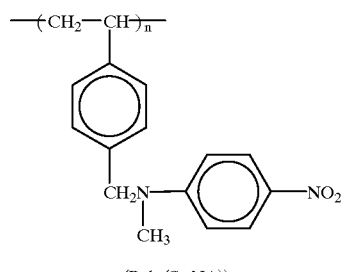
(Poly(St-NA))
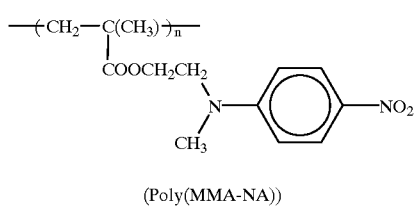
(Poly(MMA-NA))
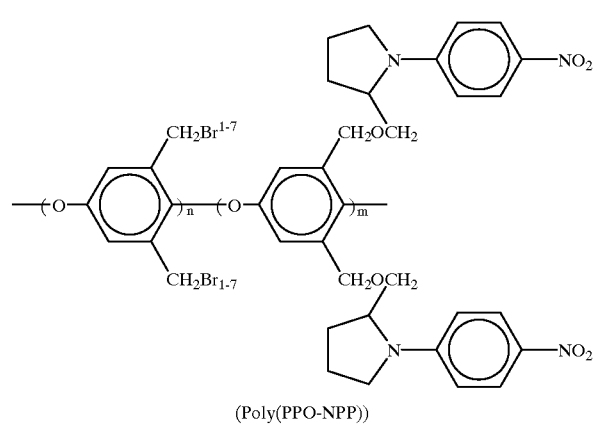
(Poly(PPO-NPP))

-continued
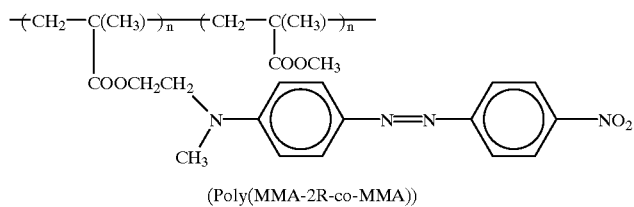
(Poly(MMA-2R-co-MMA))
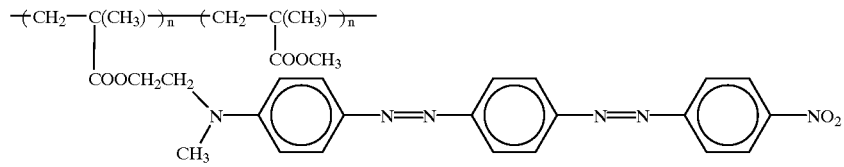
(Poly(MMA-3R-CO-MMA))
(Polymer 1)
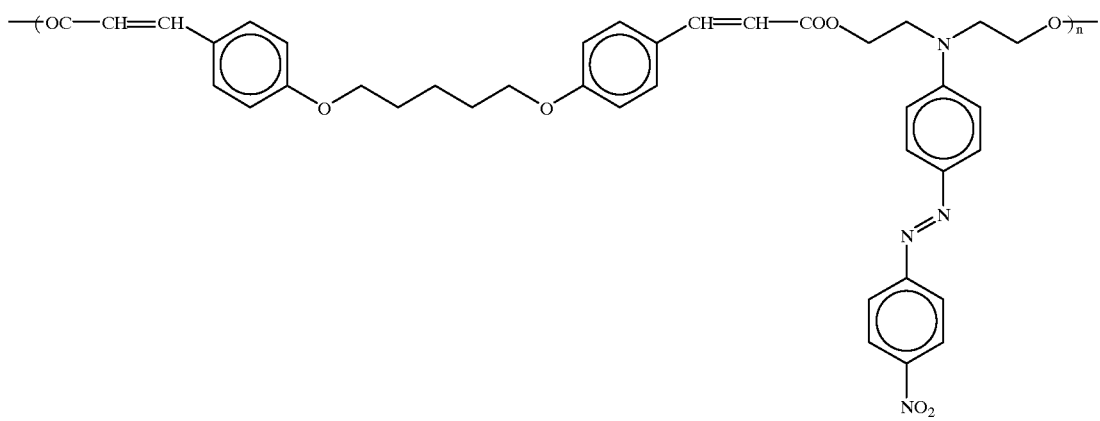
(Polymer 2)
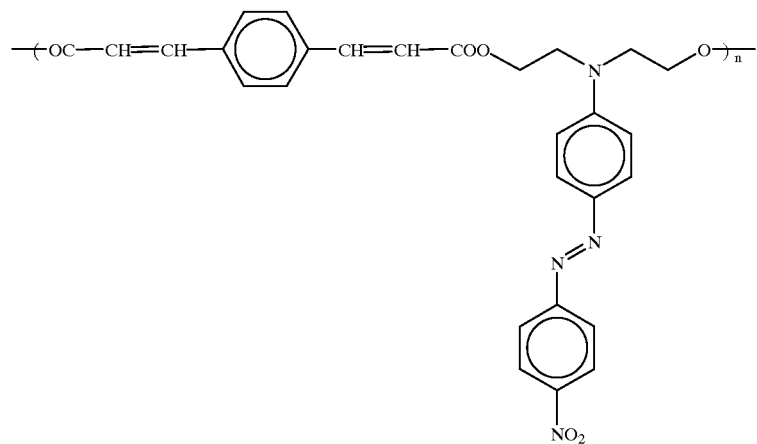

(Polymer 3)
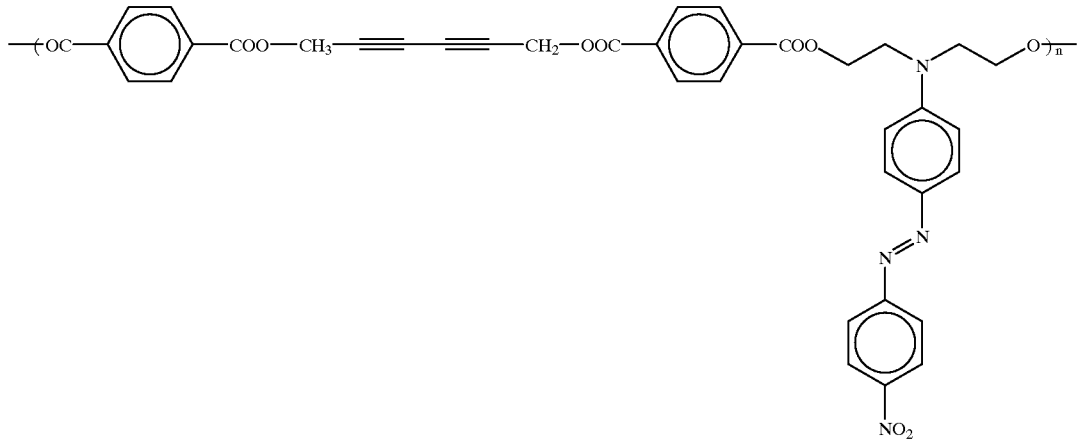
(Polymer 4)
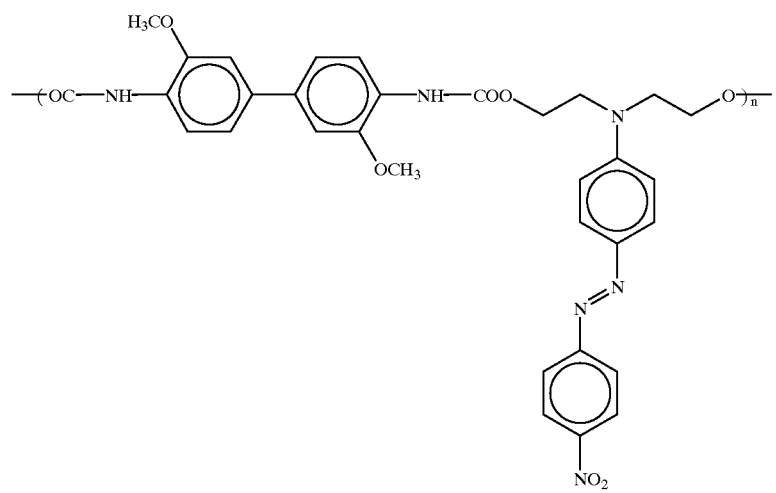
(Polymer 5)
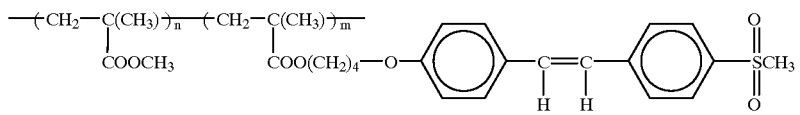
(Polymer 6)
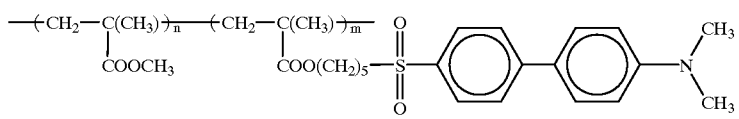

Specific examples, among the modified polymers (2), of the main-chain side-chain polymers in which the chromophores are chemically modified are the following polymers.
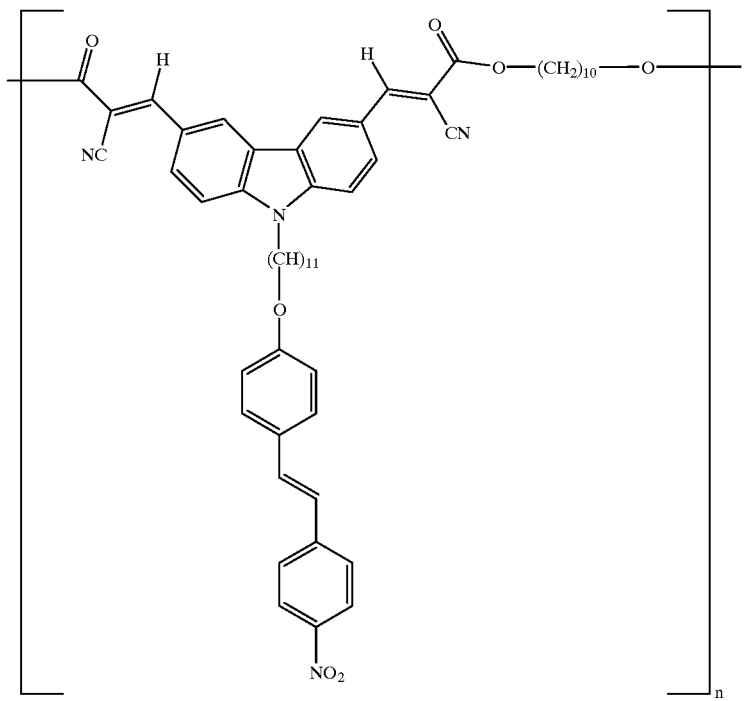
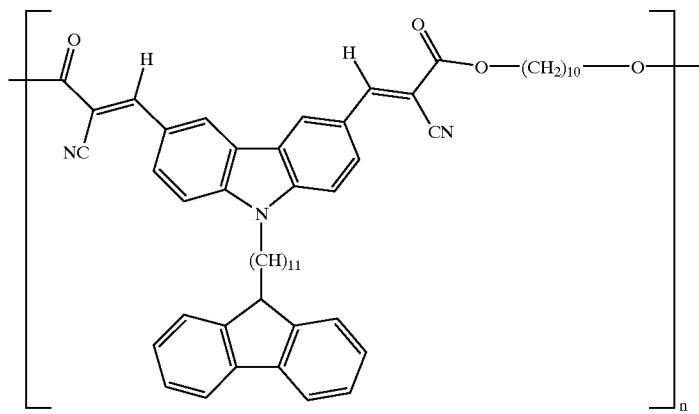

-continued
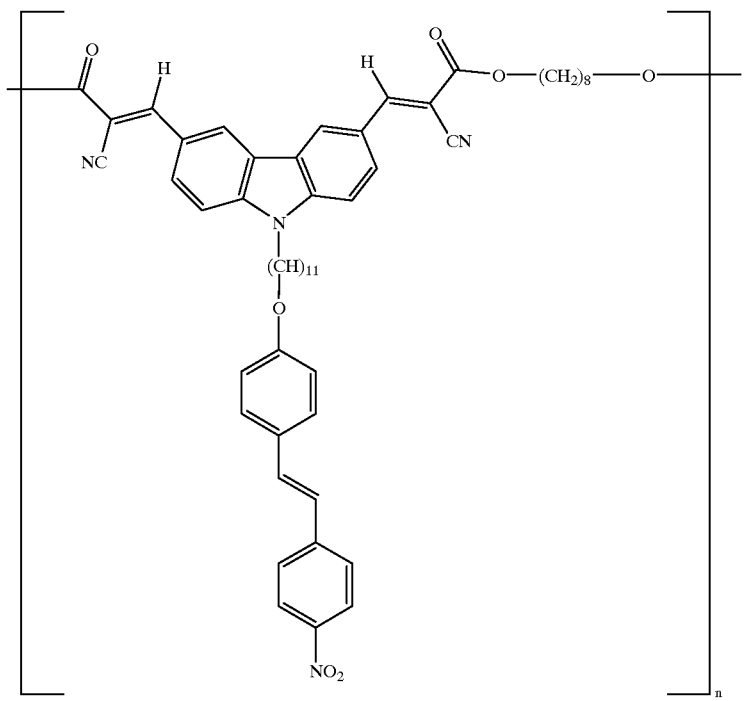
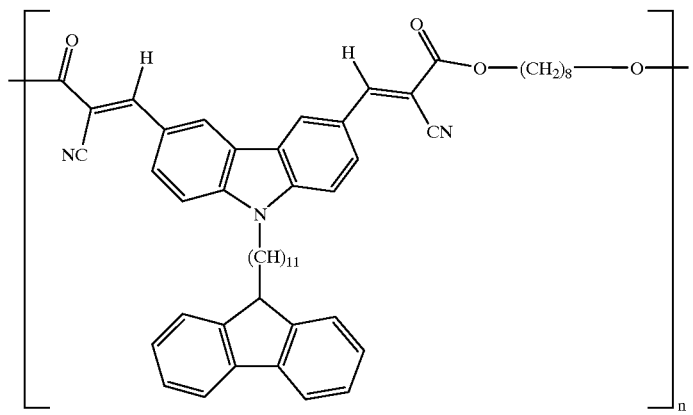
Specific examples, among the modified polymers (2), of hyper-branched polymers in which the chromophores are chemically modified are the following polymers.

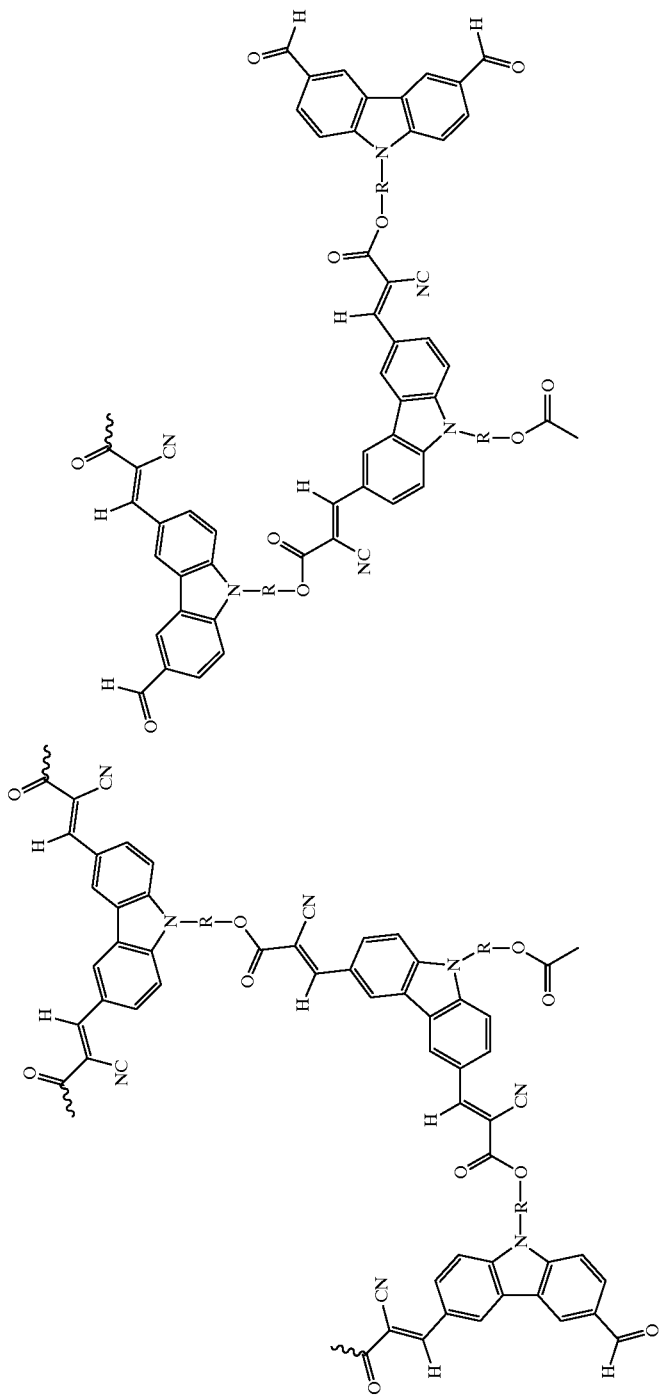

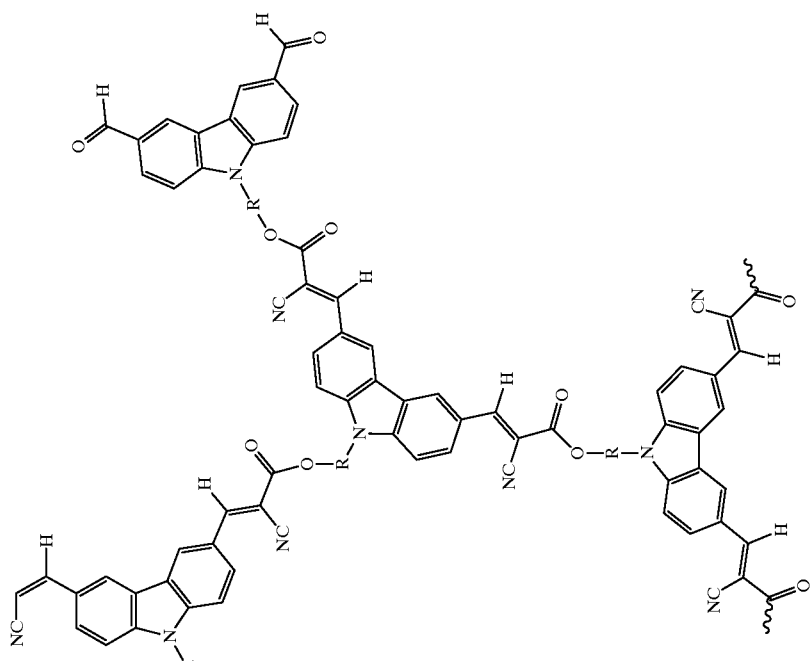
-continued
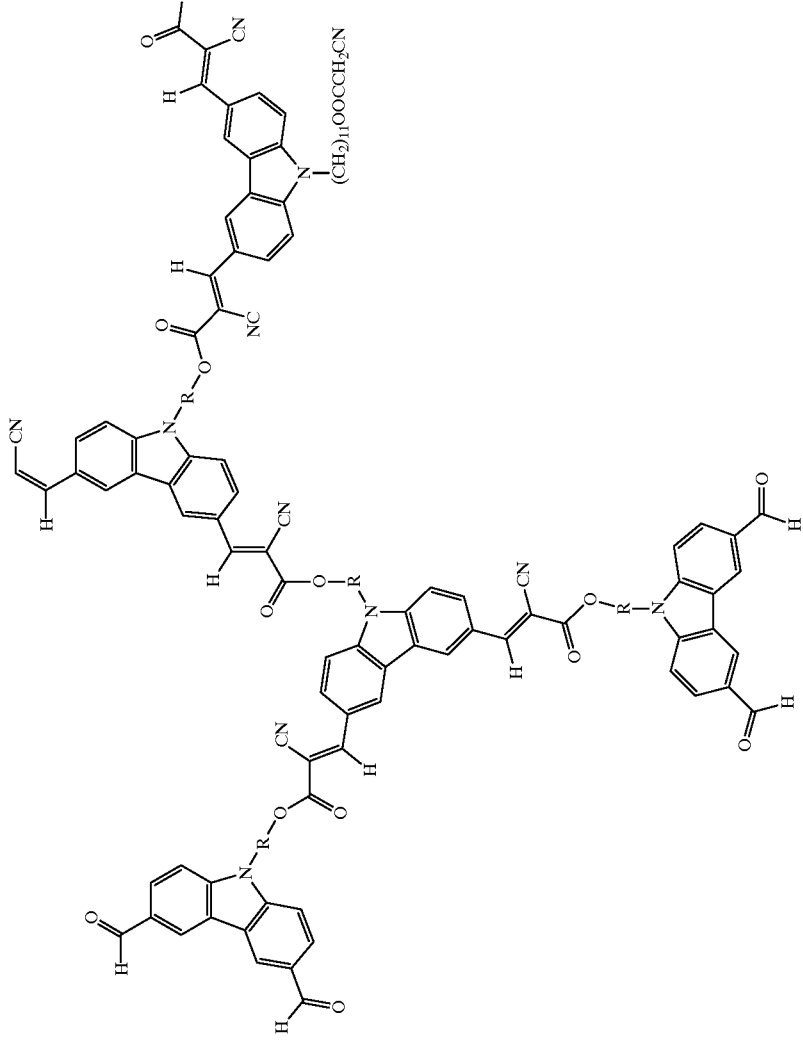
R = —(CH$_2$)$_{11}$— general formula (1)
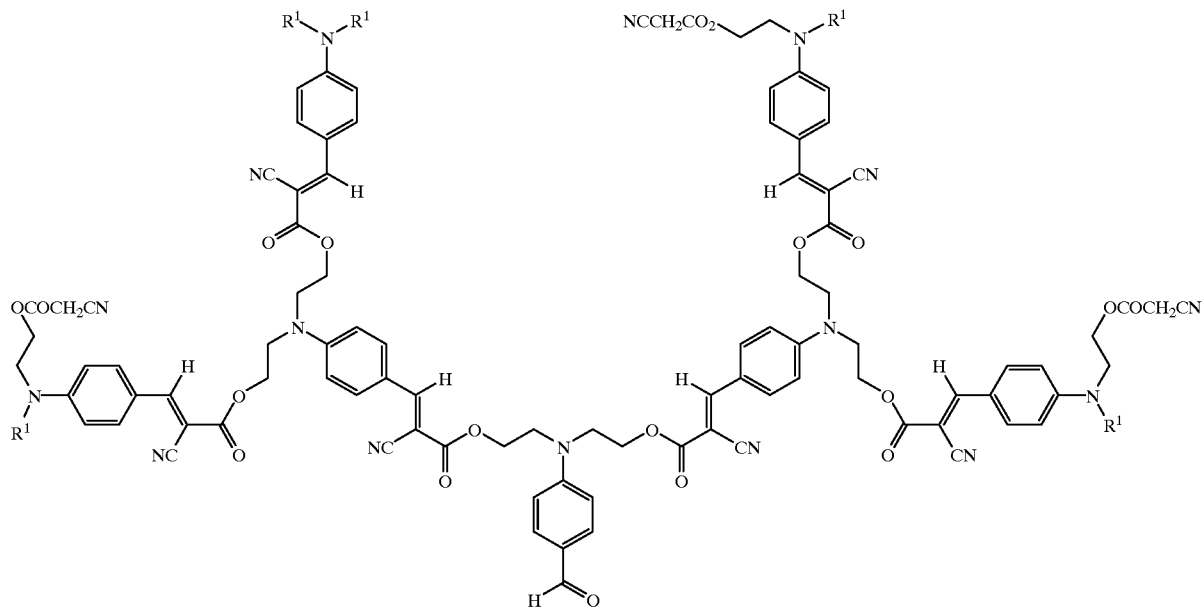
In general formula (1), R[1] represents the following substituents.
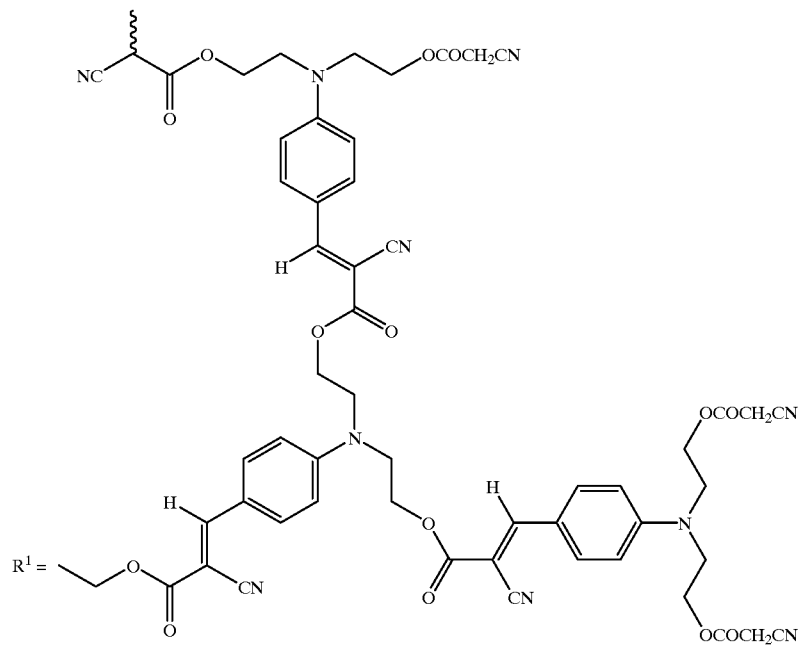

Among these modified polymers (2), main-chain side-chain polymers are preferable because greater second order non-linear optical properties can be expected therefrom due to chromophores being included in the main chain and the side chains, and because it is easy for the molecules to become orientated due to the chromophores being included in the side chains which have a high degree of freedom.

Specific examples of crosslinked polymers (3) are the following polymers or following polymers having monomers.

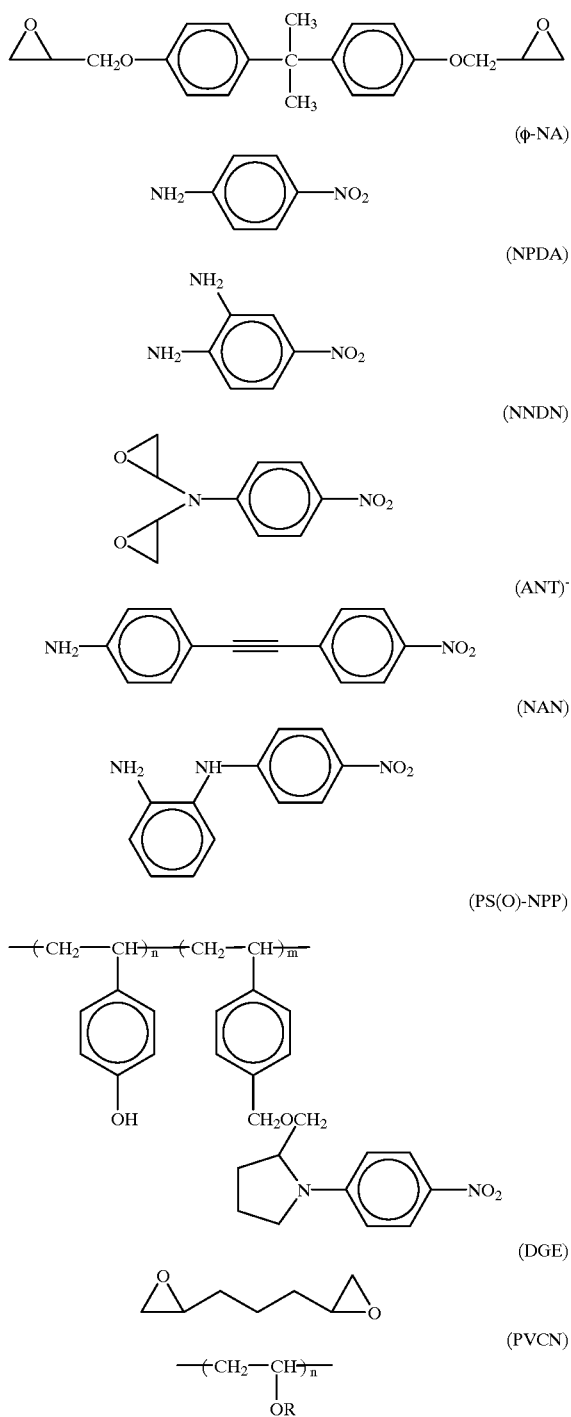

-continued

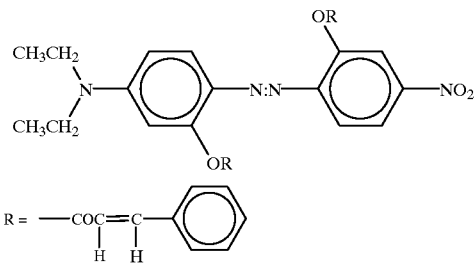

In the present invention, the polymer solution is obtained by at least one of the above polymers being dissolved in an organic solvent. The organic solvent which is used here can be arbitrarily selected in accordance with the polymer, and is not particularly limited. When the organic solvent is a high-boiling-point solvent, it is preferable to heat the substrates during rotation. The most preferable means for placing the polymer solution between the substrates 10, 12 is a method of injecting the polymer solution into the gap between the substrates 10, 12. However, when the polymer solution has a relatively high viscosity, a method may be used in which, for example, the polymer solution is applied to one of the substrates and that substrate is set together with the other substrate such that the polymer solution is interposed therebetween.

In addition to the polymer and the organic solvent, the polymer solution may also include components such as sensitizing dyes, crosslinking agents or the like in accordance with the type of the polymer, the application of the polymer film and the like.

The concentration, viscosity and the like of the polymer solution are selected arbitrarily in accordance with the thickness of the polymer film to be manufactured, the convenience of injecting the polymer solution into the gap between the substrates 10, 12, and the like. Further, the gap between the substrate 10 and the substrate 12 is preferably from 0.3 mm to 2 mm, and more preferably from 0.5 to 1.5 mm, although it depends on the concentration, viscosity and the like of the polymer solution. When the gap between the substrates 10, 12 is more narrow than 0.3 mm, it becomes difficult to inject the polymer solution and the two substrates become stuck together via the polymer solution, which is not preferable. When the gap between the substrates 10, 12 is wider than 2 mm, the polymer solution may leak out from the gap between the substrates to the exterior.

With regard to the sizes of the substrates 10, 12, the length thereof in the vertical direction is preferably from 1 to 5 cm, and more preferably from 2 to 3 cm. The width thereof in the horizontal direction is preferably from 3 to 10 cm, and more preferable from 5 to 8 cm. If the substrates 10, 12 are larger than the aforementioned preferable ranges, a large amount of the polymer solution will be needed. Conversely, if the substrates 10, 12 are smaller than the aforementioned preferable ranges, a sufficient centrifugal force will not act on the polymer solution.

The rotational speed of the substrates may be the same level as that of rotational speeds used in conventional spin coating methods, i.e., from 1000 to 5000 rpm, and preferably from 2000 to 3000 rpm.

In the above embodiment, an aspect is described in which the substrates are disposed vertically. However, in the present invention, "vertically" is not limited to "vertically" in the strictest sense of the word, and the present invention also encompasses all aspects in which the substrates are rotated in an inclined state provided that the effects of the present invention can still be obtained.

The polymer film obtained by the method of the present invention exhibits two polar orientations which are opposite within the same plane of the polymer film. Thus, the polymer film is optimal for devices in which phase modulation is carried out by a push-pull arrangement. In such devices, because the polymer film has polar alignment in two opposite directions within the same plane, an optical modulating element whose degree of modulation is improved twice as much can be obtained.

EXAMPLES

Example

A polymer solution was prepared in which 5 mg of a main-chain side-chain polymer, which had the nitrostilbene dye (DANS) expressed by the following formula covalently bonded in the side chains and included carbazole in the main chain, was dissolved in 300 µl of chloroform. Commercially-available slide glasses were used as the substrates 10, 12. A slide glass having a thickness of 1 mm was interposed at the peripheral portion between the two substrates 10, 12 such that a gap, whose cross-section in the vertical direction was a recessed configuration, was formed between the two substrates. Next, 50 µl of the polymer solution was measured out and placed in an injection syringe, and the polymer solution 16 was injected into the recess portion between the two substrates. The substrates 10, 12 were fixed vertically on the rotating stand having rotation axis 14, and were rotated for 10 seconds at 3000 rpm via the rotation axis 14. Thereafter, the substrates 10, 12 were dried in a vacuum for 24 hours at room temperature so that the residual solvent was removed. By the above method, the polymer films were formed on the substrates 10, 12.

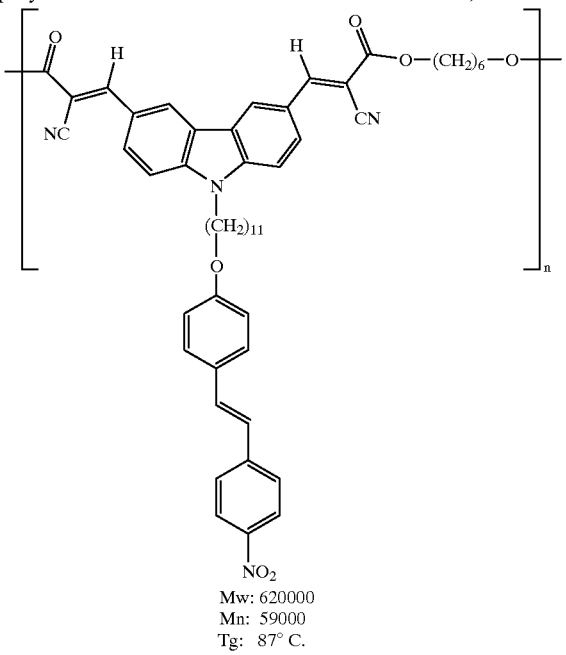

Mw: 620000
Mn: 59000
Tg: 87° C.

Figure 2:
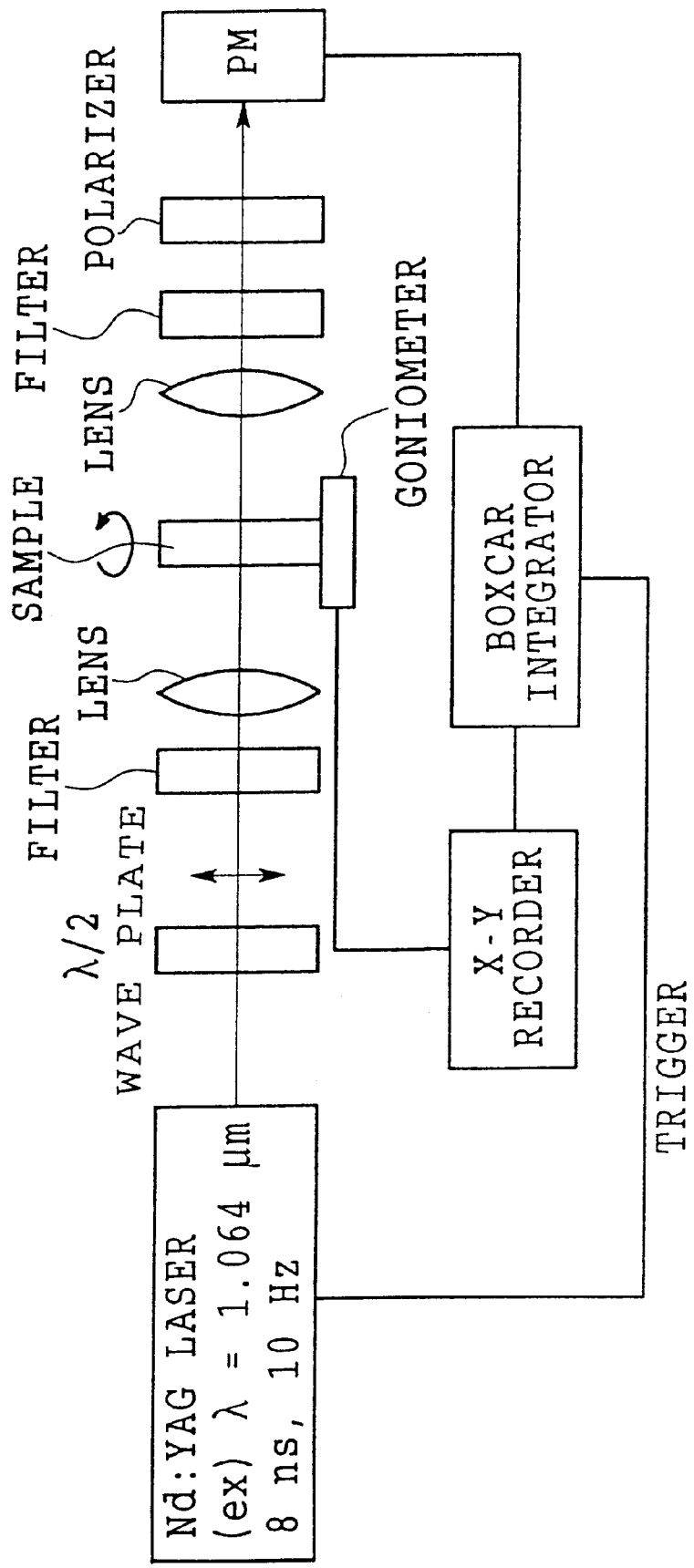
FIG. 2 is a diagram for explaining an SHG Maker fringe measurement system used in the Example and Comparative Examples.

Next, by using an SHG Maker fringe measurement system such as that illustrated in FIG. 2 as a means for measuring the second order non-linear optical properties, the substrates 10 or 12 was fixed to a rotating stand, and light irradiated a sample while the substrates 10 or 12 was rotated, and the SHG fringe intensity was detected by a detector. An Nd:YAG laser ($\lambda$=1064 nm) was used as the light source. The results are shown by the ⊙ marks in the graph of FIG. 3. From the graphed ⊙ marks in FIG. 3, it is clear that the regions exhibiting the function of the second order non-linear optical properties (i.e., the chromophores) are orientated with an in-plane polar anisotropy on the substrate.

Further, in order to confirm that the orientation arose due to centrifugal force, SHG phase measurement for determining the absolute orientation of the chromophores was conducted.

SHG Phase Measurement

Figure 4A:
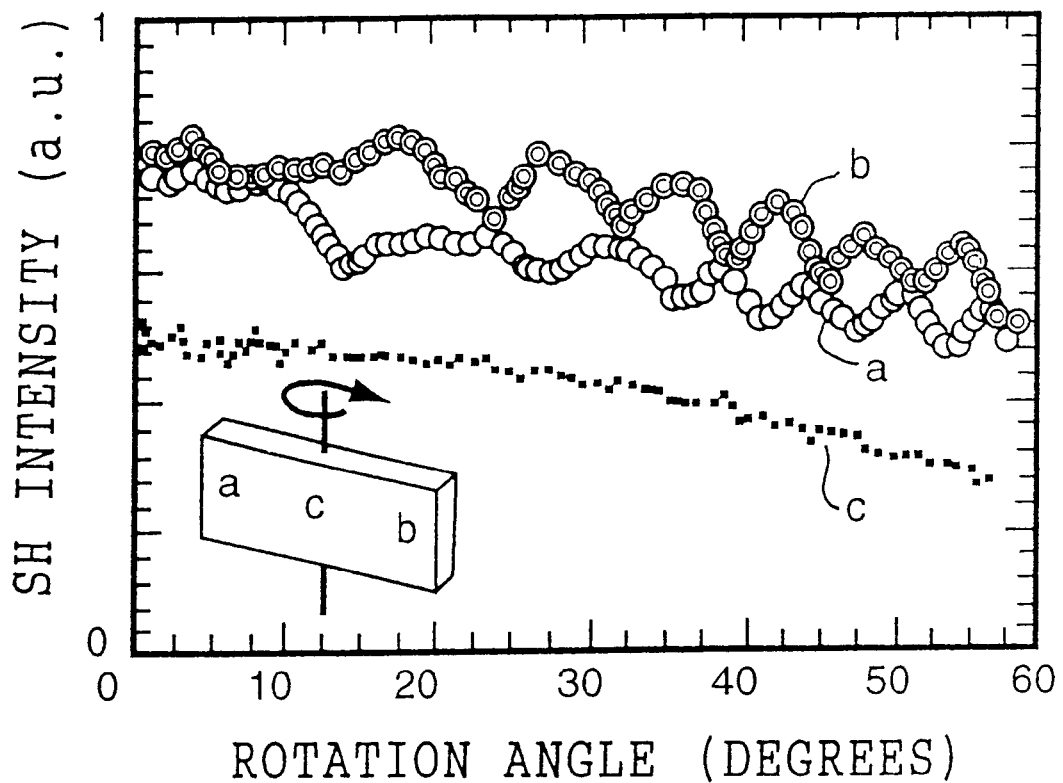
FIG. 4A is a graph illustrating the results of SHG phase measurement of the polymer film of the Example.
Figure 4B:
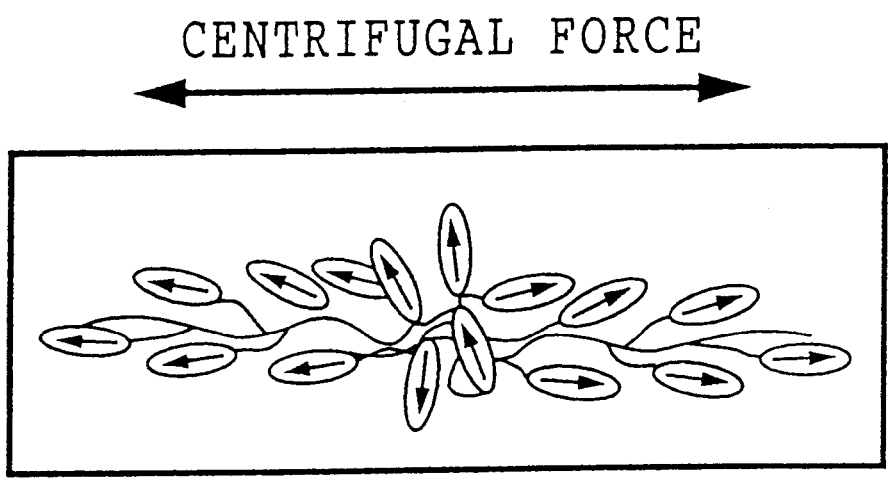
FIG. 4B is a model diagram of molecular orientation of the polymer film on a substrate.

An Nd:YAG laser ($\lambda$=1064 nm) was used, and samples whose absolute molecular orientations were already known were used as a reference sample and as a standard sample. The results of measurement are shown in FIG. 4A. From FIG. 4A, it is clear that the polymer film obtained by the method of the present invention is orientated due to centrifugal force. Accordingly, modeling the molecular orientation on the substrate results in an orientated state such as that of FIG. 4B.

Thermal Stability

When the obtained polymer film was heated for 24 hours at a temperature (90° C.) greater than or equal to the Tg thereof, it was found that the disorientation was about 10%.

Comparative Example 1

A polymer solution was prepared in which 5 mg of a main-chain side-chain polymer, which had the nitrostilbene dye (DANS) expressed by the above formula covalently bonded in the side chains and included carbazole in the main chain, was dissolved in 300 µl of chloroform. Commercially-available slide glasses were used as the substrates. After the polymer solution was applied dropwise onto the substrates, the substrates were fixed in the horizontal direction to the rotating stand equipped with the rotation axis 14. The substrates were rotated for 10 seconds at 3000 rpm via the rotation axis 14. Thereafter, the substrates were dried in a vacuum for 24 hours at room temperature so that the residual solvent was removed. By the above method, the polymer films were formed on the substrates.

Next, by using an SHG Maker fringe measurement system such as that illustrated in FIG. 2 as a means for measuring the second order non-linear optical properties, light irradiated a sample while the substrates fixed to a rotating stand were rotated, and the SHG fringe intensity was detected by a detector. An Nd:YAG laser ($\lambda$=1064 nm) was used as the light source. The results are shown by the ○ marks in the graph of FIG. 3. From these results, it is clear that the film was inactive with respect to second harmonic generation (SHG).

Comparative Example 2

In the above-described method of Comparative Example 1, after the polymer film was formed, the obtained polymer film was heated for 30 minutes at 90° C. Thereafter, an electric field was applied thereto for 30 minutes at 90° C., and then an electric field was applied for 30 minutes while the polymer film was cooled to room temperature, so as to obtain the film aligned by electrical field.

Thermal Stability

The obtained polymer film was left at room temperature, and a disorientation of around 10% was confirmed after several minutes. After 24 hours, a disorientation of about 50% was confirmed.

In accordance with the method of manufacturing a polymer film having second order non-linear optical properties, the polymer films, and the non-linear optical element of the present invention, the polymer film has polar orientation in two opposite directions within the same plane. The polymer film is useful in devices utilizing phase modulation and the like.

Further, the method of manufacturing a polymer film having a second order non-linear optical properties of the present invention is a method in which polymer solution is rotated while interposed between two substrates. Thus, the molecules can be orientated by utilizing centrifugal force. A film which is highly stable and which is more uniform can be formed. Further, it is easy to control the film thickness, and two films having the same conditions can be formed simultaneously. Further, the amount of material of the polymer solution which is used can be reduced, and an orientated film can be obtained in a short period of time. In addition, the formed film has excellent thermal stability, and it is difficult for disorientation to occur therein.

What is claimed is:

1. A method of manufacturing a polymer film having second order non-linear optical properties, said method comprising the steps of:

placing a polymer solution between two substrates which are disposed substantially perpendicular with respect to a rotating stand and substantially symmetrical with respect to a rotation axis of the rotating stand; and rotating the rotating stand to form a polymer film having second order non-linear optical properties due to centrifugal force arising at the polymer solution.

2. The method of claim 1, wherein the polymer solution is a solution in which at least one of the following types of polymers is dissolved in an organic solvent: (1) a host-guest polymer in which low molecular weight compounds are dispersed in polymers; (2) a modified polymer in which regions which express a function of second order non-linear optical properties are chemically modified in polymer side chains and/or a polymer main chain; and (3) a crosslinked polymer.

3. The method of claim 1, wherein the polymer solution is a solution in which a modified polymer, in which regions which express function of a second order non-linear optical properties are chemically modified in polymer side chains and/or a polymer main chain, is dissolved in an organic solvent.

4. The method of claim 1, wherein the step of placing the polymer solution between the two substrates includes injecting the solution.

5. The method of claim 1, wherein the step of rotating the rotating stand includes rotating the stand at a rotational speed of 1000 to 5000 rpm.

6. The method of claim 5, wherein the rotating stand is rotated at a rotational speed of 2000 to 3000 rpm.

7. The method of claim 1, wherein the two substrates are separated by a gap of 0.3 to 2 mm from one another.

8. The method of claim 7, wherein the gap is from 0.5 to 1.5 mm.

9. The method of claim 3, wherein the step of placing the polymer solution between the two substrates includes injecting the solution.

10. The method of claim 3, wherein the step of rotating the rotating stand includes rotating the stand at a rotational speed of 1000 to 5000 rpm.

11. The method of claim 3, wherein the two substrates are separated by a gap of 0.3 to 2 mm from one another.

12. The method of claim 9, wherein the two substrates are separated from one another by a gap of 0.3 to 2 mm, and the step of rotating the rotating stand includes rotating the stand at a rotational speed of 1000 to 5000 rpm.

13. The method of claim 12, wherein the rotating stand is rotated at a rotational speed of 2000 to 3000 rpm, and the gap is from 0.5 to 1.5 mm.

14. A polymer film having second order non-linear optical properties, said polymer film being manufactured by a method including the steps of:

placing a polymer solution between two substrates which are disposed substantially perpendicular with respect to a rotating stand and substantially symmetrical with respect to rotation axis of the rotating stand; and rotating the rotating stand to form a polymer film having second order non-linear optical properties due to centrifugal force arising at the polymer solution.

15. The polymer film of claim 14, wherein the polymer solution is a solution in which at least one of the following types of polymers is dissolved in an organic solvent: (1) a host-guest polymer in which low molecular weight compounds are dispersed in polymers; (2) a modified polymer in which regions which express a function of second order non-linear optical properties are chemically modified in polymer side chains and/or a polymer main chain; and (3) a crosslinked polymer.

16. The polymer film of claim 14, wherein the polymer solution is a solution in which a modified polymer, in which regions which express a function of second order non-linear optical properties are chemically modified in polymer side chains and/or a polymer main chain, is dissolved in an organic solvent.

17. A non-linear optical element comprising a polymer film having second order non-linear optical properties, said polymer film being manufactured by a method including the steps of:

placing a polymer solution between two substrates which are disposed substantially perpendicular with respect to a rotating stand and substantially symmetrical with respect to a rotation axis of the rotating stand; and rotating the rotating stand to form a polymer film having second order non-linear optical properties due to centrifugal force arising at the polymer solution.

18. The non-linear optical element of claim 17, wherein the polymer solution is a solution in which at least one of the following types of polymers is dissolved in an organic solvent: (1) a host-guest polymer in which low molecular weight compounds are dispersed in polymers; (2) a modified polymer in which regions which express a function of second order non-linear optical properties are chemically modified in polymer side chains and/or a polymer main chain; and (3) a crosslinked polymer.

19. The non-linear optical element of claim 17, wherein the polymer solution is a solution in which a modified polymer, in which regions which express a function of second order non-linear optical properties are chemically modified in polymer side chains and/or a polymer main chain, is dissolved in an organic solvent.

* * * * *